(12) United States Patent
Köcher et al.

(10) Patent No.: US 7,425,516 B2
(45) Date of Patent: Sep. 16, 2008

(54) POLYURETHANE UREA SOLUTIONS

(75) Inventors: Jürgen Köcher, Langenfeld (DE); Gerald Kurek, Leverkusen (DE); Holger Casselmann, Odenthal (DE); Jürgen Urban, Köln (DE); Thomas Feller, Solingen (DE)

(73) Assignee: Bayer MaterialScience AG, Leverkusen (DE)

( * ) Notice: Subject to any disclaimer, the term of this patent is extended or adjusted under 35 U.S.C. 154(b) by 71 days.

(21) Appl. No.: 11/356,827

(22) Filed: Feb. 17, 2006

(65) Prior Publication Data

US 2006/0189234 A1 Aug. 24, 2006

(30) Foreign Application Priority Data

Feb. 23, 2005 (DE) .................. 10 2005 008 182

(51) Int. Cl.
*B32B 5/02* (2006.01)
*B32B 27/04* (2006.01)
*B32B 3/26* (2006.01)
*B32B 27/00* (2006.01)
*D06N 3/00* (2006.01)

(52) U.S. Cl. ............... 442/79; 442/85; 442/86; 428/151; 428/160; 428/423.1

(58) Field of Classification Search ............ 442/85, 442/79; 428/423.1, 904, 151
See application file for complete search history.

(56) References Cited

U.S. PATENT DOCUMENTS

| 3,573,247 | A | 3/1971 | Minobe et al. | 260/31.2 |
| 4,035,213 | A | 7/1977 | Thoma et al. | 156/231 |
| 4,401,801 | A | 8/1983 | Pedain et al. | 528/67 |
| 5,178,788 | A | 1/1993 | Marquis et al. | 252/162 |
| 5,563,193 | A | 10/1996 | Abel et al. | 524/86 |
| 5,688,855 | A | 11/1997 | Stoy et al. | 524/505 |

*Primary Examiner*—Lynda Salvatore
(74) *Attorney, Agent, or Firm*—Noland J. Cheung

(57) ABSTRACT

This invention relates to solutions of polyurethaneureas in γ-butyrolactone or mixtures of γ-butyrolactone with toxicologically acceptable organic solvents. A process for coating substrates using these polyurethaneurea solutions, and substrates coated by said process are also provided. The substrates coated according to the invention are preferably textile products or leather, but materials such as wood or concrete can also be coated according to the invention.

7 Claims, No Drawings

POLYURETHANE UREA SOLUTIONS

CROSS-REFERENCE TO RELATED APPLICATION

This application claims priority to German application DE 10 2005 008182, filed Feb. 23, 2005.

FIELD OF THE INVENTION

This invention relates to solutions of polyurethaneureas in γ-butyrolactone or mixtures of γ-butyrolactone with toxicologically acceptable organic solvents. A process for coating substrates using these polyurethaneurea solutions, and substrates coated by said process are also provided.

BACKGROUND OF THE INVENTION

The coating of substrates, for example textile fabrics, with polyurethane systems belongs to the state of the art. A distinction is made here between water-based polyurethane dispersions and solvent-based systems.

The water-based polyurethane systems cover a large field of application and have the advantage of being able substantially to dispense with volatile organic substances. Because of their necessarily hydrophilic character, however, the coatings produced have a lower water resistance than the corresponding polyurethane coatings produced from organic solutions, because the hydrophilizing groups remain in the coating film.

If it is desired to produce coatings with a good water resistance, polyurethane systems based on organic solvents are preferable to the water-based systems. In the case of one-component polyurethanes, the film forming process is a physical process which, in contrast to two-component polyurethanes, is not accompanied by a chemical reaction.

One-component polyurethaneurea coatings based on organic solvents are greatly valued by users because of their hardness, elasticity and resistance, and are used e.g. to produce finishes on textiles. Such systems are prepared by reacting an aliphatic or aromatic diisocyanate with a linear macrodiol (polyetherdiol, polyesterdiol or polycarbonatediol) to give a prepolymer, and then adjusting it to the required molecular weight by reaction with an aliphatic diamine as chain extender. Because of their structure, made up of the hard urea segment and the soft macrodiol segment, such linear polyurethaneurea solutions, which give particularly resistant coatings, have a tendency to associate and crystallize from organic solution. A good processability and good properties of the polyurethane coating are therefore no longer guaranteed.

To prevent this crystallization, solvent mixtures are recommended in the state of the art which are now regarded as unacceptable solvents in the light of improved toxicological knowledge. For aliphatic polyurethaneureas DE-A 3 134 112 and DE-A 2 457 387 recommend solvent mixtures of aromatic hydrocarbons and alcohols, for example mixtures of toluene and isopropanol.

In the light of more recent toxicological knowledge, toluene is a dangerous substance and should no longer be used in solvent mixtures for polyurethaneureas in textile coating. The amide-containing and urea-containing solvents also conventionally used hitherto in textile coating, such as dimethylformamide, dimethylacetamide, N-methylpyrrolidone or tetramethylurea, are likewise harmful solvents and for this reason are also unusable even though their solubilizing power is known to be good.

The use of additives that disturb crystallization, for example mixtures of different amines for extending chains, does not have the desired effect either. Moreover, this deliberate introduction of heterogeneity into the polymer disturbs its composition to the point that the desired properties of the product, namely the coating, are lost. The use of a suitable solvent system is preferable to this attempted solution to the problem.

In order to be able to make further use of one-component polyurethaneurea solutions whose properties are known to be of a good standard, it is therefore necessary to have novel, toxicologically acceptable solvent systems. However, as illustrated in the Comparative Examples, many toxicologically acceptable solvent mixtures cannot be used to prepare polyurethaneurea solutions that are stable to crystallization.

SUMMARY OF THE INVENTION

The object of the present invention was therefore to find novel substrate-coating solutions with which it is possible to produce polyurethaneurea-based coatings whose properties are at least equal to the state of the art in this field, but whose preparation and use do not require toxicologically unacceptable solvents. These formulations or solutions must be stable, which means in particular that the dissolved polymers must not precipitate or crystallize out, i.e. that the solutions have a high storage stability.

This object was achieved with the help of solutions of linear or only slightly branched polyurethaneureas. The suitable solvent according to the invention is γ-butyrolactone, preferably in a mixture with other toxicologically acceptable solvents. In one aspect, therefore, the invention provides a solution of polyurethaneureas in solvents comprising γ-butyrolactone.

In other aspects the present invention provides substrates coated with these solutions, as well as a process for preparing the solution comprising 1) reacting a macrodiol and, optionally a low-molecular weight aliphatic diol, with a diisocyanate until all hydroxyl groups have been consumed;
2) adding a solvent comprising γ-butyrolactone or solvent mixtures comprising γ-butyrolactone to the composition obtained in step 1); and
3) adding a chain extender to the mixture obtained in step 2).

DETAILED DESCRIPTION OF PREFERRED EMBODIMENTS

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

A polyurethaneurea solution according to the invention, optionally in a mixture of organic solvents, contains preferably 15-60 wt. % of solids, particularly preferably 20-40 wt. % of solids, and these solutions have a γ-butyrolactone content preferably of 10-80 wt. %, particularly preferably of 15-50 wt. %, based on the whole solution, together with other solvents such as alcohols, esters and ketones.

Polyurethaneureas which can be used per se are all those known to be suitable for coating, especially those whose usability for textile coating is known to those skilled in the art or seems appropriate prima facie.

Polyurethaneureas that are preferably used according to the invention are those synthesized from a) a macrodiol (polyetherdiol, polyesterdiol or polycarbonatediol) having a molecular weight of between 600 and 4000, particularly preferably of between 1000 and 3000, or mixtures of said macrodiol components, or mixtures of one of said macrodiols with a short-chain aliphatic diol having a molecular weight of between 50 and 500, 0.2-0.5 mol of the short-chain aliphatic diol being added per mol of macrodiol, b) 0.5-2.0 mol of an aliphatic or cycloaliphatic diamine or hydrazine per mol of macrodiol, as a so-called chain extender, and c) 1.5-3.0 mol of an aliphatic, cycloaliphatic or aromatic diisocyanate, preferably an aliphatic or cycloaliphatic diisocyanate, per mol of macrodiol.

The polyurethaneureas contained in the coating compositions according to the invention for textile fabrics are high-molecular, but practically uncrosslinked, thermoplastic polyurethaneureas prepared in solution or in the melt. They are characterized inter alia in that they can be prepared and used without the concomitant use of dimethylformamide, dimethylacetamide, N-methylpyrrolidone, tetramethylurea, toluene or other toxic, highly polar solvents. These polyurethaneureas according to the invention can be prepared, dissolved and used in γ-butyrolactone or the solvent mixtures based on γ-butyrolactone used according to the invention, and other toxicologically acceptable solvents such as alcohols, esters and ketones.

It is also surprising that, despite γ-butyrolactone being a relatively high-boiling solvent, the coating compositions according to the invention are distinguished by outstanding properties such as the adhesion and hardness of the dried film.

A large number of polyurethane raw materials that are known in principle are suitable as synthetic components of the polyurethanes on which the coating compositions according to the invention are based.

Macrodiols (a), i.e. polyhydroxyl compounds having a mean hydroxyl functionality of about 1.8 to 2.2, preferably of 1.95 to 2.05, are basically suitable. A higher degree of branching of the macrodiols is to be avoided because the high degree of crosslinking gives the resulting polyurethane solutions a very high viscosity, which is disadvantageous for processing as a coating solution. The high degree of crosslinking also prevents the resulting polyurethane solutions from being stable for several months, as the market demands. Polyethers, polyesters and polycarbonates are particularly suitable, polyesters and polycarbonates being preferred.

The suitable polyethers containing hydroxyl groups are those prepared by the polymerization of cyclic ethers, such as ethylene oxide, propylene oxide, butylene oxide, tetrahydrofuran, styrene oxide or epichlorohydrin, with themselves, e.g. in the presence of $BF_3$, or by the addition of these ring compounds, optionally in a mixture or in succession, onto starter components having reactive hydrogen atoms, such as alcohols and amines, examples being water, ethylene glycol, 1,2-propylene glycol or 1,3-propylene glycol.

The suitable polyesters containing hydroxyl groups are e.g. reaction products of polyhydric alcohols, preferably dihydric alcohols, with polybasic carboxylic acids, preferably dibasic carboxylic acids. In place of the free carboxylic acids, the polyesters can also be prepared using the corresponding polycarboxylic anhydrides or corresponding polycarboxylic esters of lower alcohols, or mixtures thereof.

The polycarboxylic acids can be of an aliphatic, cycloaliphatic, aromatic and/or heterocyclic nature and can optionally be substituted, e.g. by halogen atoms, and/or unsaturated. The following may be mentioned as examples:

succinic acid, adipic acid, sebacic acid, phthalic acid, isophthalic acid, trimellitic acid, phthalic anhydride, tetrahydrophthalic anhydride, hexahydrophthalic anhydride, tetrachlorophthalic anhydride, glutaric anhydride, maleic acid, maleic anhydride, fumaric acid or dimethyl terephthalate.

Examples of suitable polyhydric alcohols are ethylene glycol, 1,2-propylene glycol, 1,3-propylene glycol, 1,4-butylene glycol, 2,3-butylene glycol, 1,6-hexanediol, 1,8-octanediol, neopentyl glycol or 2-methyl-1,3-propanediol. Polyesters from lactones, e.g. ε-caprolactone, can also be used.

The suitable polycarbonates containing hydroxyl groups are those which can be prepared e.g. by reacting diols, such as 1,3-propanediol, 1,4-butanediol, 1,6-hexanediol or di-, tri- or tetraethylene glycol, with diaryl or dialkyl carbonates or phosgene. Preferred polycarbonates are those based on 1,6-hexanediol as well as co-diols having a modifying action, e.g. 1,4-butanediol, or ε-caprolactone.

The macrodiols used are preferably polyesters and polycarbonates and the very particularly preferred macrodiols for textile coating according to the invention are polycarbonates.

Examples of suitable short-chain aliphatic diols are ethylene glycol, propylene glycol, neopentyl glycol, diethylene glycol, triethylene glycol, diethanolamine, 2-ethyl-1,3-hexanediol, N-methyldiisopropanolamine, 1,3-propanediol, 1,4-propanediol, 1,3-butanediol, 1,4-butanediol or 1,6-hexanediol. 0.2-0.5 mol of the short-chain aliphatic diol is added per mol of macrodiol.

So-called chain extenders (b) are also used to produce the polyurethane coatings according to the invention. Such chain extenders are hydrazine or aliphatic diamines, e.g. ethylenediamine, propylenediamine, 1,6-hexamethylenediamine or other aliphatic diamines. Cycloaliphatic diamines such as 1,4-bis(amino-methyl)cyclohexane, 4,4'-diamino-3,3'-dimethyldicyclohexylmethane and other ($C_1$-$C_4$)-dialkyl- and ($C_1$-$C_4$)-tetraalkyldicyclohexylmethanes, e.g. 4,4'-diamino-3,5-diethyl-3',5'-diisopropyldicyclohexylmethane, are also suitable. 1-Amino-3,3,5-trimethyl-5-aminomethylcyclohexane (isophoronediamine) and 4,4'-diaminodicyclohexylmethane are preferred.

About 0.5-2.0 mol, preferably 0.6-1.7 mol, of chain extenders (b) are used per mol of macrodiol mixture (a).

It is conventional to use approximately equivalent amounts of chain extenders, based on the isocyanate remaining after subtraction of the proportion of isocyanate that has reacted with the macrodiol mixture. It is preferable, however, to use less than the equivalent amount, down to about 30-80% of the NCO groups. The residual NCO groups can be reacted with monofunctional terminators such as butylamine, stearylamine, trialkoxysilylpropanamine, butanone oxime or morpholine. This prevents an excessive growth of the molecular weight or crosslinking and branching reactions. The alcohols contained in the solvent mixture can also act in this form as chain extenders.

The diisocyanates (c) which can be used are all the aliphatic, cycloaliphatic and/or aromatic isocyanates known to those skilled in the art which have a mean NCO functionality of ≧1, preferably of ≧2, individually or in any desired mixtures with one another, it being unimportant whether they have been prepared by phosgene processes or phosgene-free processes.

It is preferable to use isocyanates from the aliphatic or cycloaliphatic series, their carbon skeleton (excluding the NCO groups present) having 3 to 30 carbon atoms, preferably 4 to 20 carbon atoms.

Particularly preferred compounds of component (c) correspond to the aforementioned type with aliphatically and/or cycloaliphatically bonded NCO groups, such as bis(isocyanatoalkyl) ethers, bis- and tris(isocyanato-alkyl)benzenes, -toluenes and -xylenes, propane diisocyanates, butane diisocyanates, pentane diisocyanates, hexane diisocyanates (e.g. hexamethylene diisocyanate, HDI), heptane diisocyanates, octane diisocyanates, nonane diisocyanates (e.g. trimethyl-HDI (TMDI), normally as a mixture of the 2,4,4 and 2,2,4 isomers), nonane triisocyanates (e.g. 4-isocyanatomethyl-1,8-octane diisocyanate), decane diisocyanates, decane triisocyanates, undecane diisocyanates, undecane triisocyanates, dodecane diisocyanates, dodecane triisocyanates, 1,3- and 1,4-bis(isocyanatomethyl)cyclohexanes ($H_6XDI$), 3-isocyanatomethyl-3,5,5-trimethylcyclohexyl isocyanate (isophorone diisocyanate, IPDI), bis(4-isocyanatocyclohexyl) methane ($H_{12}MDI$) or bis(isocyanatomethyl)norbornane (NBDI).

Very particularly preferred compounds of component (c) are hexamethylene diisocyanate (HDI), trimethyl-HDI (TMDI), 2-methyl-1,5-pentane diisocyanate (MPDI), isophorone diisocyanate (IPDI), 1,3- and 1,4-bis(isocyanatomethyl)cyclohexane ($H_6XDI$), bis(isocyanatomethyl)norbornane (NBDI), 3(4)-isocyanatomethyl-1-methylcyclohexyl isocyanate (IMCI) and/or 4,4'-bis(isocyanatocyclohexyl) methane ($H_{12}MDI$), or mixtures of these isocyanates.

About 1.5-3.0 mol, preferably 1.7-2.8 mol, of diisocyanate component (c) are used per mol of macrodiol mixture (a).

To produce the polyurethaneurea coatings according to the invention, macrodiol, optionally a low-molecular aliphatic diol, and diisocyanate are reacted together in the melt or in solution until all the hydroxyl groups have been consumed. This is followed by the addition of further solvents and the diamine chain extender, optionally in solution. When the target viscosity has been reached, the residual NCO groups are blocked with a monofunctional aliphatic amine or with butanone oxime.

Suitable solvents for the production and use of the polyurethaneurea coatings according to the invention are mixtures of alcohols with γ-butyrolactone, the proportion of γ-butyrolactone, based on the total weight of the polyurethane solution, being between 10 wt. % and 80 wt. %, preferably between 15 wt. % and 50 wt. %. Examples of the alcohols that can be used together with the γ-butyrolactone are ethanol, n-propanol, isopropanol and 1-methoxy-2-propanol. Furthermore, esters and ketones, for example ethyl acetate, butyl acetate, acetone, methyl ethyl ketone and methyl isobutyl ketone, can also be used concomitantly.

The polyurethaneureas according to the invention have melting points above 100° C. and preferably of 130° C. to 220° C. They have high adhesion and surface hardness and high elongation at break and ultimate tensile strength.

They can be used in any desired concentrations adjusted to the particular use or to the type of substrate to be coated. It is preferable to use 15-60 wt. % solutions and particularly preferable to use 20 to 40 wt. % solutions.

The polyurethaneurea solutions according to the invention are preferably used for coating textile fabrics and leather. They can be applied directly by printing, spraying, knife coating or transfer coating. The polyurethaneurea solutions according to the invention are particularly important for the production of coating articles on textile substrates by the transfer process. Here the polyurethaneurea solutions according to the invention are used as finish coatings producing a coverage of 5 to 60 g/m² on the carrier fabric.

Conventional additives and auxiliary substances, such as agents for improving handle, pigments, dyestuffs, matting agents, UV stabilizers, phenolic antioxidants, light stabilizers, hydrophobizing agents and/or flow control agents, can be used concomitantly.

Despite using the relatively high-boiling solvent γ-butyrolactone, the finishes obtained with the polyurethaneurea solutions according to the invention have very good fastness properties. The high adhesion, hardness and ultimate tensile strength are particularly advantageous.

The advantages of the polyurethaneurea solutions according to the invention are illustrated by means of comparative experiments in the Examples which follow.

EXAMPLES

The dynamic viscosities of the polyisocyanate solutions were determined at 23° C. on a VT 550 viscometer with a PK 100 cone-and-plate measuring arrangement from Haake (Karlsruhe, Germany). Measurements were made at different shear rates in order to ensure that the flow behaviour of the polyisocyanate mixtures used, and that of the reference products, corresponded to the flow behaviour of ideal Newtonian liquids. The details of the shear rate can therefore be omitted.

The NCO content of the resins described in the Examples and Comparative Examples was determined by titration according to DIN 53 185. The NCO values given in the Examples are always based on the initial weight of the reaction mixture in the synthesis step in question, and not on the total solution.

Unless indicated otherwise, the quantities given in % are understood as meaning wt. % and are based on the total solution obtained.

The hydrolysis tests on the films obtained from the polyurethane solutions were performed according to DIN EN 12280-3.

Example 1

This Example describes the preparation of a polyurethaneurea solution according to the invention.

200 g of a polycarbonatediol of average molecular weight 2000, prepared from dimethyl carbonate and 1,6-hexanediol, are mixed with 63.3 g of 1-methoxypropyl acetate and 52.3 g of isophorone diisocyanate and the mixture is reacted at 110° C. to a constant NCO content of 3.60%. It is left to cool and diluted with 211.2 g of γ-butyrolactone and 188.9 g of isopropanol. A solution of 23.9 g of 4,4'-diaminodicyclohexylmethane in 169.1 g of 1-methoxy-2-propanol is added at room temperature. When the molecular weight has stopped rising and the desired viscosity range has been reached, 1 g of n-butylamine is added to block the residual NCO content. This gives 909 g of a 30% solution of polyurethaneurea in 1-methoxypropyl acetate/γ-butyrolactone/isopropanol/1-methoxy-2-propanol with a viscosity of 21,500 mPas at 22° C.

The resulting solution is completely stable to crystallization and free of turbidity or precipitate. No turbidity at all can be observed even after storage for 6 months at room temperature.

Example 2

This Example describes the preparation of a polyurethaneurea solution according to the invention.

200 g of a polycarbonatediol of average molecular weight 2000, prepared from dimethyl carbonate and 1,6-hexanediol, are mixed with 63.3 g of 1-methoxypropyl acetate and 52.3 g of isophorone diisocyanate and the mixture is reacted at 110° C. to a constant NCO content of 3.60%. It is left to cool and diluted with 211.2 g of γ-butyrolactone and 188.9 g of isopropanol. A solution of 21.2 g of 4,4'-diamino-dicyclohexylmethane in 161.8 g of 1-methoxy-2-propanol is added at room temperature. When the molecular weight has stopped rising and the desired viscosity range has been reached, 3.5 g of (3-aminopropyl)triethoxysilane are added to block the residual NCO content. This gives 909 g of a 30% solution of polyurethaneurea in 1-methoxypropyl acetate/γ-butyrolactone/isopropanol/1-methoxy-2-propanol with a viscosity of 34,800 mPas at 22° C.

The resulting solution is completely stable to crystallization. No turbidity at all can be observed even after storage for 6 months at room temperature.

Example 3

Comparative Example (Solution Containing Toluene)

This Example describes the preparation of a polyurethaneurea solution using toluene.

The procedure is as described in Example 2. The γ-butyrolactone is replaced with the same amount of toluene, all the other educts and reaction parameters remaining as described in Example 2. This gives 909 g of a 30% polyurethaneurea solution with a viscosity of 30,000 mPas which is stable for 6 months at room temperature.

Example 4

Comparative Example without Using Toluene or γ-Butyrolactone

This is a Comparative Example for comparison with Example 1 according to the invention.

This polyurethaneurea solution is prepared as described in Example 1, the following change being made to Example 1:

The γ-butyrolactone is replaced with the same amount of methyl ethyl ketone.

This gives a 30% solution of polyurethaneurea in 1-methoxypropyl acetate/methyl ethyl ketone/isopropanol/1-methoxy-2-propanol with a viscosity of 30,400 mPas at 22° C.

An increasing turbidity of the solution is observed after storage for 2 weeks at room temperature.

Example 5

Comparative Example without Using Toluene or γ-Butyrolactone

This is a Comparative Example for comparison with Example 1 according to the invention.

This polyurethaneurea solution is prepared as described in Example 1, the following changes being made to Example 1:

The γ-butyrolactone is replaced with the same amount of 1-methoxypropyl acetate.

The 1 g of n-butylamine is replaced with 4 g of (3-aminopropyl)triethoxysilane to block the residual NCO content.

This gives a slightly turbid 30% solution of polyurethaneurea in 1-methoxypropyl acetate/isopropanol/1-methoxy-2-propanol with a viscosity of 22,000 mPas at 22° C. The turbidity of the solution increases after a few days.

Example 6

Comparative Example without Using Toluene or γ-Butyrolactone

This is a Comparative Example for comparison with Example 1 according to the invention.

This polyurethaneurea solution is prepared as described in Example 1, the following changes being made to Example 1:

The γ-butyrolactone is replaced with a mixture of 111.2 g of 1-methoxypropyl acetate and 100 g of propylene carbonate.

The 1 g of n-butylamine is replaced with 3.5 g of (3-aminopropyl)triethoxysilane to block the residual NCO content.

This gives a 30% solution of polyurethaneurea in 1-methoxypropyl acetate/propylene carbonate/isopropanol/1-methoxy-2-propanol with a viscosity of 33,000 mPas. The solution becomes turbid after storage for 4 days at room temperature.

Example 7

Comparative Example without Using Toluene or γ-Butyrolactone

This is a Comparative Example for comparison with Example 1 according to the invention.

This polyurethaneurea solution is prepared as described in Example 1, the following change being made to Example 1:

The γ-butyrolactone is replaced with a mixture of 111.2 g of 1-methoxypropyl acetate and 100 g of butyl acetate.

Because of the lack of solubility of the polymer formed, the mixture gels after the addition of 80% of the total amount of 4,4'-diaminodicyclohexylmethane in 1-methoxy-2-propanol.

Example 8

Comparative Example without Using Toluene or γ-Butyrolactone

This is a Comparative Example for comparison with Example 1 according to the invention.

This polyurethaneurea solution is prepared as described in Example 1, the following changes being made to Example 1:

The γ-butyrolactone is replaced with the same amount of butyl acetate.

The 1 g of n-butylamine is replaced with 7 g of (3-aminopropyl)triethoxysilane to block the residual NCO content.

This gives a 30% solution of polyurethaneurea in 1-methoxypropyl acetate/butyl acetate/isopropanol/1-methoxy-2-propanol with a viscosity of 36,000 mPas at 22° C. A pronounced turbidity of the solution is observed after storage for 8 days at room temperature.

Example 9

Comparative Example without Using Toluene or γ-Butyrolactone

This is a Comparative Example for comparison with Example 1 according to the invention.

This polyurethaneurea solution is prepared as described in Example 1, the following change being made to Example 1:

The γ-butyrolactone is replaced with the same amount of butyl acetate.

This gives a 30% solution of polyurethaneurea in 1-methoxypropyl acetate/butyl acetate/isopropanol/1-methoxy-2-propanol with a viscosity of 39,200 mPas at 22° C. A strong turbidity of the solution is observed after storage for 4 days at room temperature.

Example 10

Comparative Example without Using Toluene or γ-Butyrolactone

This is a Comparative Example for comparison with Example 1 according to the invention.

This polyurethaneurea solution is prepared as described in Example 1, the following changes being made to Example 1:

The γ-butyrolactone is replaced with a mixture of 161.2 g of butyl acetate and 50 g of propylene carbonate.

The 1 g of n-butylamine is replaced with 3.5 g of (3-aminopropyl)triethoxysilane to block the residual NCO content.

This gives a 30% solution of polyurethaneurea in 1-methoxypropyl acetate/butyl acetate/propylene carbonate/isopropanol-methoxy-2-propanol with a viscosity of 39,200 mPas at 22° C. A turbidity of the solution is observed after storage for 6 days at room temperature.

Example 11

Comparative Example without Using Toluene or γ-Butyrolactone

This is a Comparative Example for comparison with Example 1 according to the invention.

This polyurethaneurea solution is prepared as described in Example 1, the following changes being made to Example 1:

The 1-methoxypropyl acetate is replaced with the same amount of butyl acetate, and the γ-butyrolactone is replaced with the same amount of butyl acetate.

The 1 g of n-butylamine is replaced with 3.5 g of (3-aminopropyl)triethoxysilane to block the residual NCO content.

This gives a 30% solution of polyurethaneurea in butyl acetate/isopropanol/1-methoxy-2-propanol with a viscosity of 27,500 mPas at 22° C. A pronounced turbidity of the solution is observed after storage for 3 days at room temperature.

Example 12

This Example describes the preparation of a polyurethaneurea solution according to the invention.

400 g of a polycarbonatediol of average molecular weight 2000, prepared from dimethyl carbonate and 1,6-hexanediol, are mixed with 82.2 g of isophorone diisocyanate and the mixture is reacted at 110° C. to a constant NCO value of 2.9%. It is then diluted with 357.8 g of γ-butyrolactone and 238.4 g of isopropanol.

A solution of 22.6 g of isophoronediamine in 190 g of 1-methoxy-2-propanol is added at room temperature. When the reaction has ended, 2 g of n-butylamine are added to block the residual NCO content.

This gives 1293 g of a 38% solution of polyurethaneurea in γ-butyrolactone/isopropanol/1-methoxy-2-propanol with a viscosity of 37,000 mPas at 22° C.

The resulting solution is completely stable to crystallization. No turbidity at all can be observed after storage for 6 months at room temperature.

Example 13

This Example describes the preparation of a polyurethaneurea solution according to the invention.

400 g of a polycarbonatediol of average molecular weight 2000, prepared from dimethyl carbonate and 1,6-hexanediol, are mixed with 82.2 g of isophorone diisocyanate and the mixture is reacted at 110° C. to a constant NCO value of 2.9%. It is then diluted with 357.8 g of γ-butyrolactone and 238.4 g of isopropanol.

A solution of 22.8 g of isophoronediamine in 214.3 g of 1-methoxy-2-propanol is added at room temperature. When the reaction has ended, 7 g of (3-aminopropyl)triethoxysilane are added to block the residual NCO content.

This gives 1322.5 g of a 38% solution of polyurethaneurea in γ-butyrolactone/isopropanol/1-methoxy-2-propanol with a viscosity of 50,400 mPas at 22° C.

The resulting solution is completely stable to crystallization. No turbidity at all can be observed after storage for 6 months at room temperature.

Example 14

Comparative Example (Solution Containing Toluene)

This Example describes the preparation of a polyurethaneurea solution using toluene.

The procedure is as described in Example 13. The γ-butyrolactone is replaced with the same amount of toluene, all the other educts and reaction parameters remaining as described in Example 13. This gives 1322.5 g of a 38% polyurethaneurea solution with a viscosity of 48,000 mPas which is stable for 6 months at room temperature.

Example 15

Comparative Example without Using Toluene or γ-Butyrolactone

This Example is a Comparative Example for comparison with Example 1 according to the invention.

This polyurethaneurea solution is prepared as described in Example 1, the following changes being made to Example 1:

The γ-butyrolactone is replaced with the same amount of butyl acetate.

The 2 g of n-butylamine are replaced with 6.5 g of (3-aminopropyl)triethoxy-silane to block the residual NCO content.

This gives a 38% solution of polyurethaneurea in butyl acetate/isopropanol/1-methoxy-2-propanol with a viscosity of 32,500 mPas at 22° C. A pronounced turbidity of the solution is observed after storage for only one day at room temperature.

Example 16

This Example describes the preparation of a polyurethaneurea solution according to the invention.

183.8 g of a polycarbonatediol of average molecular weight 2000, prepared from dimethyl carbonate and 1,6-hexanediol, are mixed with 50.6 g of 1-methoxy-2-propyl acetate, 3.9 g of N-methyldiisopropanolamine and 57.3 g of isophorone diisocyanate and the mixture is reacted at 110° C. to a constant NCO content of 3.9%. It is left to cool to 50° C. and diluted with 255.2 g of γ-butyrolactone and 333.5 g of tert-butanol. A solution of 24.7 g of 4,4'-diaminodicyclohexylmethane in 73.6 g of tert-butanol, 59.2 g of 1-methoxy-2-propyl acetate and 46.6 g of γ-butyrolactone is added at room temperature. When the molecular weight has stopped rising and the desired viscosity range has been reached, 6 g of butanone oxime are added to block the residual NCO content. This gives 1094.4 g of a 25.2% solution of polyurethaneurea in γ-butyrolactone/tert-butanol/1-methoxy-2-propyl acetate with a viscosity of 16,000 mPas at 22° C.

The resulting solution is free of turbidity and stable to crystallization for 6 months.

Example 17

This Example describes the preparation of a polyurethaneurea solution according to the invention.

183.8 g of a polycarbonatediol of average molecular weight 2000, prepared from dimethyl carbonate and 1,6-hexanediol, are mixed with 50.6 g of butyl acetate, 3.9 g of N-methyldiisopropanolamine and 57.3 g of isophorone diisocyanate and the mixture is reacted at 110° C. to a constant NCO content of 3.9%. It is left to cool to 90° C. and diluted with 255.2 g of γ-butyrolactone and 333.5 g of tert-butanol. A solution of 25.7 g of 4,4'-diaminodicyclohexylmethane in 71.3 g of tert-butanol and 102.5 g of 1-methoxy-2-propyl acetate is added at room temperature. When the molecular weight has stopped rising and the desired viscosity range has been reached, 6 g of butanone oxime are added to block the residual NCO content. This gives 1089.7 g of a 25.4% solution of polyurethaneurea in γ-butyrolactone/butyl acetate/tert-butanol/1-methoxy-2-propyl acetate with a viscosity of 17,200 mPas at 22° C.

The resulting solution is free of turbidity and stable to crystallization for 6 months.

Example 18

This Example describes the preparation of a polyurethaneurea solution according to the invention.

183.8 g of a polycarbonatediol of average molecular weight 2000, prepared from dimethyl carbonate and 1,6-hexanediol, are mixed with 50.6 g of gamma-butyrolactone, 3.9 g of N-methyldiisopropanolamine and 57.3 g of isophorone diisocyanate and the mixture is reacted at 110° C. to a constant NCO content of 3.9%. It is left to cool to 90° C. and diluted with 255.2 g of γ-butyrolactone and 333.5 g of tert-butanol. A solution of 25.6 g of 4,4'-diaminodicyclohexylmethane in 74.6 g of tert-butanol and 107.3 g of 1-methoxy-2-propyl acetate is added at room temperature. When the molecular weight has stopped rising and the desired viscosity range has been reached, 5 g of butanone oxime are added to block the residual NCO content. This gives 1096.8 g of a 25.1% solution of polyurethaneurea in γ-butyrolactone/tert-butanol/1-methoxy-2-propyl acetate with a viscosity of 12,800 mPas at 22° C.

The resulting solution is free of turbidity and stable to crystallization for 6 months.

Example 19

This Example describes the preparation of a polyurethaneurea according to the invention in solution.

183.8 g of a polycarbonatediol of average molecular weight 2000, prepared from dimethyl carbonate and 1,6-hexanediol, are mixed with 50.6 g of butyl acetate, 3.9 g of N-methyldiisopropanolamine and 57.3 g of isophorone diisocyanate and the mixture is reacted at 110° C. to a constant NCO content of 3.9%. It is left to cool to 90° C. and diluted with 255.2 g of gamma-butyrolactone and 333.5 g of tert-butanol. A solution of 26.6 g of 4,4'-diaminodicyclohexylmethane in 72.1 g of tert-butanol and 103.6 g of 1-methoxy-2-propyl acetate is added at room temperature. When the molecular weight has stopped rising and the desired viscosity range has been reached, 2.0 g of 1-butylamine are added to block the residual NCO content. This gives 1090.6 g of a 25.1% solution of polyurethaneurea in gamma-butyrolactone/butyl acetate/tert-butanol/1-methoxy-2-propyl acetate with a viscosity of 11,000 mPas at 22° C.

The resulting solution is free of turbidity and stable to crystallization for 6 months.

Example 20

Comparative Example (Solution Containing Toluene)

This Example describes the preparation of a polyurethaneurea solution using toluene, but without using γ-butyrolactone, as a Comparative Example for comparison with Examples 16, 17, 18 and 19 according to the invention.

The procedure is as described in Example 17. The butyl acetate and γ-butyrolactone are replaced with the same amounts of toluene, all the other educts and reaction parameters remaining as described in Example 17.

This gives 1089.7 g of a 25.4% solution of polyurethaneurea in toluene/tert-butanol/1-methoxy-2-propyl acetate with a viscosity of 14,000 mPas at 22° C.

Example 21

Comparative Example without Using Toluene or γ-Butyrolactone

This is a Comparative Example for comparison with Examples 16-19 according to the invention.

183.8 g of a polycarbonatediol of average molecular weight 2000, prepared from dimethyl carbonate and 1,6-hexanediol, are mixed with 50.6 g of butyl acetate, 3.9 g of N-methyldiisopropanolamine and 57.3 g of isophorone diisocyanate and the mixture is reacted at 110° C. to a constant NCO content of 3.9%. It is left to cool to 90° C. and diluted with 255.2 g of butyl acetate and 333.5 g of tert-butanol. A solution of 24.6 g of 4,4'-diaminodicyclohexylmethane in 74.1 g of tert-butanol and 106.5 g of 1-methoxy-2-propyl acetate is added at room temperature. A gelling of the mixture is observed during the addition of the chain extension solutions. When the molecular weight has stopped rising and the desired viscosity range has been reached, 7 g of butanone oxime are added to block the residual NCO content. This gives 1096.4 g of a 25.2% solution of polyurethaneurea in butyl acetate/tert-butanol/1-methoxy-2-propyl acetate with a viscosity of 24,000 mPas at 22° C.

The resulting solution contains gel particles and is therefore already slightly turbid. A marked increase in the turbidity of the solution is recognizable after storage for one week at room temperature.

Example 22

Use Example

To compare the coating properties, the polyurethane solutions according to Example 1, Example 2 and Comparative Example 3 (product according to the state of the art with toluene as solvent) were used to produce coating films in a layer thickness of 0.15 mm, which were tested.

|  | Example 1 | Example 2 | Comparative Example 3 (containing toluene) |
|---|---|---|---|
| 100% modulus | 6.2 MPa | 6.1 MPa | 6.2 MPa |
| Tensile strength | 51.3 MPa | 60.2 MPa | 44.0 MPa |
| Elongation at break | 630% | 730% | 630% |
| Tensile strength after 2 weeks' hydrolysis | 47.0 MPa | 62.7 MPa | 58.3 MPa |

-continued

|  | Example 1 | Example 2 | Comparative Example 3 (containing toluene) |
|---|---|---|---|
| Elongation at break after 2 weeks' hydrolysis | 560% | 580% | 550% |
| Volume swelling in ethyl acetate | 212% | 238% | 266% |
| Melting point | 190° C. | 212° C. | 195° C. |

These results show that the polyurethane solutions according to the invention make it possible to produce coatings using toxicologically acceptable organic solvents.

Example 23

Use Example

To compare the coating properties, the polyurethane solutions according to Example 12 and Comparative Example 3 (product according to the state of the art with toluene as solvent) were used to produce coating films in a layer thickness of 0.15 mm, which were tested.

|  | Example 12 | Comparative Example 3 (containing toluene) |
|---|---|---|
| 100% modulus | 2.8 MPa | 6.2 MPa |
| Tensile strength | 40.0 MPa | 44.0 MPa |
| Elongation at break | 860% | 630% |
| Tensile strength after 2 weeks' hydrolysis | 41.5 MPa | 58.3 MPa |
| Elongation at break after 2 weeks' hydrolysis | 780% | 550% |
| Volume swelling in water | 0% | 0% |
| Melting point | 185° C. | 195° C. |

These results show that these polyurethane solutions make it possible to produce coatings using toxicologically acceptable organic solvents.

Example 24

Use Example

To compare the coating properties, the polyurethane solutions according to Example 16, Example 17 and Comparative Example 18 (containing toluene) were used to produce coating films in a layer thickness of 0.15 mm, which were tested.

|  | Example 16 | Example 17 | Comparative Example 18 (containing toluene) |
|---|---|---|---|
| 100% modulus | 8.2 MPa | 7.9 MPa | 10.5 MPa |
| Tensile strength | 57.6 MPa | 63.2 MPa | 45.0 MPa |
| Elongation at break | 600% | 700% | 400% |

-continued

|  | Example 16 | Example 17 | Comparative Example 18 (containing toluene) |
|---|---|---|---|
| Tensile strength after 2 weeks' hydrolysis | 60.2 MPa | 60.6 MPa | 43.0 MPa |
| Elongation at break after 2 weeks' hydrolysis | 540% | 590% | 380% |
| Volume swelling in ethyl acetate | 152% | 163% | 180% |
| Melting point | 210° C. | 208° C. | 185° C. |

These results show that polyurethane solutions according to the invention make it possible to produce coatings using toxicologically acceptable organic solvents.

In addition, some technically relevant properties of the coatings obtained were markedly improved.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A solution of polyurethaneureas in solvents comprising γ-butyrolactone, wherein the solution comprises 20 to 40 wt. % of dissolved polyurethaneurea and 15 to 50 wt. % of γ-butyrolactone mixed with one or more low-molecular weight alcohols selected from the group consisting of ethanol, n-propanol, isopropanol and 1-methoxypropanol, and optionally mixed with esters and/or ketones.

2. A solution according to claim 1, wherein the polyurethaneurea is synthesized from:
   a) linear macrodiols selected from the group comprising polyetherdiols, polyesterdiols and polycarbonatediols having a molecular weight of between 600 and 4000, the diol ha a mean functionality of 1.8-2.2, or from mixtures of said macrodiol components, or from mixtures of one of said macrodiols with a low-molecular aliphatic diol having a molecular weight of 50-500,
   b) 0.5-2.0 mol of an aliphatic or cycloaliphatic diamine or hydrazine per mol of diol, as a chain extender, and
   c) 1.5-3.0 mol of an aliphatic, cycloaliphatic or aromatic diisocyanate per mol of macrodiol.

3. A substrate coated with the solution of claim 1.

4. The substrate of claim 3, wherein the solution is applied to the substrate by printing, spraying, knife coating or transfer coating.

5. The substrate of claim 3, wherein the substrate is a textile.

6. The substrate of claim 3, wherein the substrate is a leather.

7. A process for the preparation of the polyurethaneurea solutions of claim 2, the process comprising
   1) reacting a macrodiol and, optionally a low-molecular weight aliphatic diol, with a diisocyanate until all hydroxyl groups have been consumed;
   2) adding a solvent mixture comprising γ-butyrolactone and one or more low molecular weight alcohols selected from the group consisting of ethanol, n-propanol, isopropanol and 1-methoxypropanol, to the composition obtained in step 1); and
   3) adding a chain extender to the mixture obtained in step 2).

* * * * *